US010951705B1

(12) United States Patent
Desai et al.

(10) Patent No.: US 10,951,705 B1
(45) Date of Patent: Mar. 16, 2021

(54) WRITE LEASES FOR DISTRIBUTED FILE SYSTEMS

(71) Applicant: EMC IP Holding Company LLC, Hopkinton, MA (US)

(72) Inventors: Rajiv Desai, Sunnyvale, CA (US); Vaibhav Kamra, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 248 days.

(21) Appl. No.: 15/199,617

(22) Filed: Jun. 30, 2016

Related U.S. Application Data

(63) Continuation-in-part of application No. 14/671,740, filed on Mar. 27, 2015.

(60) Provisional application No. 62/088,427, filed on Dec. 5, 2014.

(51) Int. Cl.
*G06F 16/182* (2019.01)
*H04L 29/08* (2006.01)
*H04L 12/26* (2006.01)

(52) U.S. Cl.
CPC ........ *H04L 67/1097* (2013.01); *G06F 16/183* (2019.01); *H04L 43/10* (2013.01)

(58) Field of Classification Search
USPC ........................................................ 707/827
See application file for complete search history.

(56) References Cited

U.S. PATENT DOCUMENTS

| | | |
|---|---|---|
| 6,091,518 A | 7/2000 | Anabuki |
| 6,112,319 A | 8/2000 | Paulson |
| 6,289,345 B1 | 9/2001 | Yasue |
| 6,324,492 B1 | 11/2001 | Rowe |
| 6,434,608 B1 | 8/2002 | Desal et al. |
| 6,434,609 B1 | 8/2002 | Humphrey |
| 6,467,048 B1 | 10/2002 | Olarig |
| 6,658,533 B1 | 12/2003 | Bogin |
| 6,959,339 B1 | 10/2005 | Wu |
| 7,533,133 B1 * | 5/2009 | Lanzatella .......... G06F 21/6218 |
| 7,590,803 B2 | 9/2009 | Wintergerst |
| 7,685,463 B1 | 3/2010 | Linnell |
| 8,122,102 B2 | 2/2012 | Wein |
| 8,224,994 B1 | 7/2012 | Schneider |
| 8,260,913 B2 | 9/2012 | Knapp |
| 8,281,035 B2 | 10/2012 | Farber |
| 1,467,167 A1 | 3/2015 | Desai |
| 1,467,174 A1 | 3/2015 | Desai et al. |
| 1,467,307 A1 | 3/2015 | Desai et al. |
| 8,984,144 B2 | 3/2015 | Schapira |

(Continued)

OTHER PUBLICATIONS

U.S. Appl. No. 16/511,252, filed Jul. 15, 2019, Rajiv Desai.

(Continued)

*Primary Examiner* — Allen S Lin

(74) *Attorney, Agent, or Firm* — Workman Nydegger

(57) ABSTRACT

A method, article of manufacture, and apparatus for providing a write leases in a distributed file system is discussed. A lease break is received for a file at a client from a metadata server ("MDS"), wherein the client has a write lease for the file. A write buffer is flushed on the client to an object store, wherein the write buffer comprises data objects comprising the file. A metadata request is transmitted from the client to the MDS in connection with flushing the write buffer. A lease extension is received for the write lease from the MDS.

6 Claims, 3 Drawing Sheets

(56) References Cited

U.S. PATENT DOCUMENTS

| | | |
|---|---|---|
| 1,486,439 A1 | 9/2015 | Panghal |
| 1,486,442 A1 | 9/2015 | Panghal |
| 1,486,533 A1 | 9/2015 | Panghal et al. |
| 9,160,704 B2 | 10/2015 | Wein |
| 1,497,842 A1 | 12/2015 | Panghal et al. |
| 1,497,848 A1 | 12/2015 | Panghal et al. |
| 1,497,852 A1 | 12/2015 | Panghal et al. |
| 9,280,683 B1 | 3/2016 | Echeverria |
| 9,286,331 B2 | 3/2016 | Knapp |
| 1,519,959 A1 | 6/2016 | Desai et al. |
| 1,519,962 A1 | 6/2016 | Desai et al. |
| 9,426,071 B1 | 8/2016 | Caldejon |
| 1,538,880 A1 | 12/2016 | Javadekar et al. |
| 9,847,966 B2 | 12/2017 | Wein |
| 9,898,477 B1 | 2/2018 | Panghal |
| 1,002,121 A1 | 7/2018 | Desai |
| 1,603,177 A1 | 7/2018 | Desai |
| 10,191,914 B2 | 1/2019 | Manville |
| 10,353,873 B2 | 7/2019 | Desai |
| 10,417,194 B1 | 9/2019 | Desai et al. |
| 10,423,507 B1 | 9/2019 | Panghal et al. |
| 10,430,385 B1 | 10/2019 | Desai et al. |
| 10,445,296 B1 | 10/2019 | Panghal |
| 10,452,619 B1 | 10/2019 | Panghal et al. |
| 10,547,585 B2 | 1/2020 | Wein |
| 2002/0124098 A1 | 9/2002 | Shaw |
| 2002/0138559 A1 | 9/2002 | Ulrich |
| 2002/0152318 A1 | 10/2002 | Menon |
| 2003/0004952 A1 | 1/2003 | Nixon et al. |
| 2003/0005084 A1 | 1/2003 | Humphrey |
| 2004/0064485 A1 | 4/2004 | Yoshida |
| 2004/0255048 A1* | 12/2004 | Lev Ran ............... G06F 9/546 709/249 |
| 2005/0246393 A1 | 11/2005 | Coates |
| 2005/0262150 A1 | 11/2005 | Krishnaswamy |
| 2006/0036602 A1 | 2/2006 | Unangst |
| 2006/0080511 A1 | 4/2006 | Hoover |
| 2006/0161642 A1 | 7/2006 | Bopardikar et al. |
| 2006/0200623 A1 | 9/2006 | Gonzalez |
| 2006/0277196 A1 | 12/2006 | Oosawa |
| 2007/0094354 A1 | 4/2007 | Soltis |
| 2007/0168542 A1 | 7/2007 | Gupta |
| 2007/0171562 A1 | 7/2007 | Maejima |
| 2007/0174333 A1 | 7/2007 | Lee |
| 2007/0179981 A1 | 8/2007 | Vincent |
| 2007/0237086 A1 | 10/2007 | Tulac |
| 2008/0005468 A1 | 1/2008 | Faibish |
| 2008/0189470 A1 | 8/2008 | Saika |
| 2008/0195483 A1 | 8/2008 | Moore |
| 2009/0083494 A1 | 3/2009 | Bhanoo |
| 2009/0300279 A1 | 12/2009 | Helsley et al. |
| 2010/0042743 A1 | 2/2010 | Jeon |
| 2010/0070982 A1 | 3/2010 | Pitts |
| 2010/0106914 A1 | 4/2010 | Krishnaprasad |
| 2010/0161657 A1 | 6/2010 | Cha |
| 2010/0250648 A1 | 9/2010 | Cao et al. |
| 2010/0293336 A1 | 11/2010 | Shribman |
| 2010/0299447 A1 | 11/2010 | Salvi |
| 2010/0332401 A1 | 12/2010 | Prahiad |
| 2010/0332456 A1 | 12/2010 | Prahiad |
| 2011/0119437 A1 | 5/2011 | Ogus |
| 2011/0145189 A1 | 6/2011 | Zheng et al. |
| 2011/0258461 A1 | 10/2011 | Bates |
| 2012/0054152 A1 | 3/2012 | Adkins |
| 2012/0151016 A1 | 6/2012 | Wein |
| 2012/0226770 A1 | 9/2012 | Schapira |
| 2012/0254116 A1 | 10/2012 | Thereska |
| 2012/0311248 A1 | 12/2012 | Goodman |
| 2013/0041872 A1 | 2/2013 | Aizman |
| 2013/0060884 A1 | 3/2013 | Bernbo |
| 2013/0110906 A1 | 5/2013 | Zearing |
| 2013/0179573 A1 | 7/2013 | McCarty |
| 2013/0226888 A1 | 8/2013 | Govind |
| 2013/0238752 A1 | 9/2013 | Park et al. |
| 2013/0290284 A1 | 10/2013 | Knapp |
| 2013/0297735 A1 | 11/2013 | Wein |
| 2013/0297969 A1 | 11/2013 | Kim |
| 2014/0039818 A1 | 2/2014 | Arya |
| 2014/0040412 A1 | 2/2014 | Yanagihara |
| 2014/0047261 A1 | 2/2014 | Patiejunas et al. |
| 2014/0156822 A1 | 6/2014 | Choi |
| 2014/0165119 A1 | 6/2014 | Liu |
| 2014/0189432 A1 | 7/2014 | Gokhale |
| 2014/0304268 A1 | 10/2014 | Gunda |
| 2014/0337484 A1 | 11/2014 | Kasten |
| 2014/0365866 A1 | 12/2014 | Kinoshita |
| 2015/0058935 A1 | 2/2015 | Tolia et al. |
| 2015/0113330 A1 | 4/2015 | Grondin |
| 2015/0161048 A1 | 6/2015 | Patil et al. |
| 2015/0180968 A1 | 6/2015 | Schapira |
| 2015/0249709 A1 | 9/2015 | Teng et al. |
| 2015/0277802 A1 | 10/2015 | Oikarinen |
| 2015/0280959 A1 | 10/2015 | Vincent |
| 2015/0350106 A1 | 12/2015 | Whalley |
| 2015/0364168 A1 | 12/2015 | Riley |
| 2016/0011816 A1 | 1/2016 | Aizman |
| 2016/0065670 A1 | 3/2016 | Kimmel et al. |
| 2016/0092354 A1 | 3/2016 | Steely |
| 2016/0196215 A1 | 7/2016 | Ogihara |
| 2016/0212208 A1 | 7/2016 | Kulkarni et al. |
| 2016/0239397 A1 | 8/2016 | Thomas |
| 2016/0269501 A1 | 9/2016 | Usgaonkar |
| 2016/0292429 A1* | 10/2016 | Manville ........... G06F 17/30094 |
| 2016/0337426 A1 | 11/2016 | Shribman |
| 2016/0357450 A1 | 12/2016 | Rao et al. |
| 2016/0364407 A1 | 12/2016 | Hong |
| 2017/0004082 A1 | 1/2017 | Sehgal |
| 2017/0277709 A1 | 9/2017 | Strauss et al. |
| 2017/0293766 A1* | 10/2017 | Schnjakin ............ G06F 21/6218 |
| 2018/0322141 A1 | 11/2018 | Desai |
| 2019/0340158 A1 | 11/2019 | Desai |
| 2020/0026689 A1 | 1/2020 | Desai et al. |

OTHER PUBLICATIONS

What is Data Deduplication?—Definition from Techopedia, https://www.techopedia.com/definition/1067/data-deduplication (Year: 2014).

What is Data Deduplication?—Definition from Techopedia, https://www.techopedia.com/definition/13725/inline-deduplication (Year: 2014).

Mark W. Storer et al, "Secure Data Deduplication", ACM 2008, 10 pages. (Year: 2008).

What is Inline Deduplication?—Definition from Techopedia, https://www.techopedia.com/definition/13725/inline-deduplication (Year: 2014).

\* cited by examiner

WRITE LEASES FOR DISTRIBUTED FILE SYSTEMS

CROSS REFERENCE TO RELATED APPLICATIONS

This application is a continuation in part and claims priority to U.S. patent application Ser. No. 14/671,740 for DISTRIBUTED FILE SYSTEMS IN MULTI-CLOUD ENVIRONMENTS, filed Mar. 27, 2015, which is incorporated herein by reference for all purposes.

FIELD OF THE INVENTION

This invention relates generally to distributed file systems, and more particularly to systems and methods for providing write leases in distributed file systems.

BACKGROUND OF THE INVENTION

Distributed file systems manage files and folders spread across multiple computers. They may serve a similar function as traditional file systems, but are designed to provide file/folder storage and controlled access over local and wide area networks.

Cloud providers may offer scalable object stores for storing data. Individuals and business may be presented with multiple cloud provider options for storing their data.

There is a need, therefore, for an improved method, article of manufacture, and apparatus for providing a distributed file systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
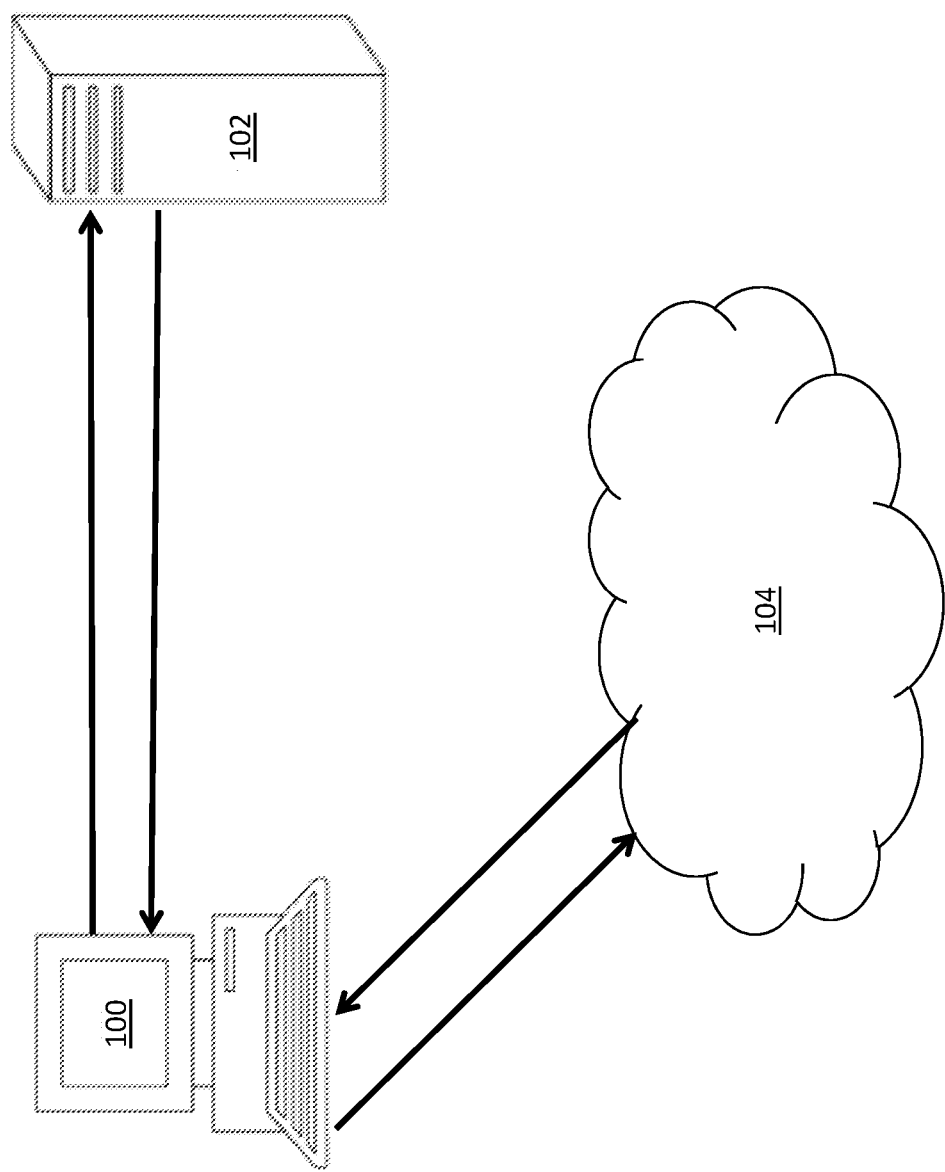
FIG. 1 depicts a system architecture for a distributed file system in a cloud environment consistent with an embodiment of the present disclosure

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Embodiments of the present disclosure address a distributed file system operating on a cloud environment. Distributed files systems may be used to manage files, folders, and other data spread across multiple computing systems. They may be presented to users, applications, or other clients as traditional file systems, but may actually provide access to data over local and wide area networks. For example, the data could be stored in a cloud based object stores, such as Amazon's AWS S3, Microsoft Azure, Google Cloud Storage, a private object store, and/or a hybrid object store. A metadata server may manage access to the data on these object stores, which could be a local or remote server from a client reading or writing the data.

FIG. 1 depicts a system implementing a distributed file system in a cloud environment. The system of FIG. 1 may include client 100, metadata server ("MDS") 102, and object store 104. While only one client 100 is shown, the system may include multiple clients accessing the distributed file system. Similarly, the system may include multiple object stores 104 and/or multiple MDS 102.

Client 100 may be any general purpose computing device. For example, client 100 may be a personal computer, workstation, handheld computer, smart phone, and/or tablet computer. Additionally or alternatively, client 100 may be a software module or application running on a general purpose computing device. Client 100 may be in communication with a MDS 102 and object store 104 over a network connection, such as a local area network ("LAN") or wide are network ("WAN"), or via any other form of communication. Client computer 100 may interact with the distributed file system as it would with a traditional file system, such as by writing data to and reading data from the distributed file system.

MDS 102 may be a general purpose computing device managing distributed file system metadata. This metadata could include, for example, the location of data stored in the distributed file system. MDS 102 may be a physical or a virtual machine, and may operate in an environment local to or remote from client 100. For example, MDS 102 may be a virtual machine operating in the same datacenter as client 100. Alternatively, MDS 102 may operate in a third party cloud environment, such as Amazon Web Services ("AWS"). In some embodiments, MDS 102 may operate in the same third party cloud environment as object store 104.

Object store 104 may comprise a storage location for storing data in the distributed file system. Object store 104 may be a private, public, or hybrid cloud environment capable of storing data. A private cloud may be an object store only available to clients belonging to a particular enterprise. For example, a private cloud may be a Open Stack SWIFT install operating in a datacenter completely under the control of an enterprise. The install, including the associated data and services, may not be accessible to anyone outside of the enterprise. A public cloud may be any object store accessible to the public that requires authentication to access certain data. For example, Amazon S3 is available to members of the public but data stored in the object store is only accessible by authorized clients. A hybrid cloud may be a combination of a private and public cloud, such that some data is stored in the private cloud and other data is stored in the public cloud.

In some embodiments, client 100 may transmit communications to and receive responses from MDS 102. Similarly, client 100 may transmit communications to and receive responses from object store 104. Typically these communications will be IO requests and responses, such as read/write communications, though any other time of communication is consistent with the present disclosure.

For example, client 100 may decide to read data from the distributed file system. Client 100 may first mount the distributed file system by transmitting a mount request and/or intent to MDS 102. Similarly, if the distributed file system has already been mounted, client 100 may transmit a change location/directory request to MDS 102. In response, MDS 102 may consult a metadata table to determine data objects located at the root of the mount or in the new location, and transmit information related to the data back to client 100. This data could be, for example, a list of files and/or directories located at the root or new location. The data may also include a unique identifier for each data object, such as a hash and/or path of the object.

Once client 100 has a list of files and/or directories, client 100 may select a data object to read. Client 100 may transmit a read request identifying the desired data object back to MDS 102. In some embodiments, this read request may include a path or hash identifier for the data object the client desires. Once MDS 102 receives the request, it may attempt to locate the data object on the distributed file system.

In an embodiment, MDS 102 maintains location data for all of the data objects in the distributed file system. This location data may be maintained with other data object metadata in a database on MDS 102. For example, the database may comprise a table mapping a data object to one or more object store locations. These object store locations could reside, for example, on object store 104.

In response to the read request received from client 100, MDS 102 may consult the database table to determine the object location. MDS 102 may then return the object location back to client 100. In an embodiment, the object location returned might be a URL the client may use to access all or part of the data object. For example, the URL may comprise "http://<object store domain>/<container identifier>/<object identifier>", where <object store domain> is the domain of the object store, <container identifier> is an identifier for the distributed file system, and <object identifier> identifies the object to be read. In an embodiment, the object identifier is a hash of the object and/or a hash of a version of the object.

Client 100 may attempt to access the data object once it receives the data object location from MDS 102. If the data object location is a URL, the client may issue an HTTP GET to the URL. For example, the client may issue a GET to object store 104 and/or the cloud service provider holding the data object. In response, object store 104 may return the requested data object to client 100.

The present system may also be used to write data objects to the distributed file system. This process may be similar to reading data objects, as discussed above. Once the distributed file system is mounted and client 100 has identified the file system location where it wishes to write the data, client 100 may transmit a write intent to MDS 102. This write intent may include the identified file system location and an object identifier for the data object client 100 intends to write. In some embodiments, this object identifier may be a hash of the data object.

Upon receiving the intent, MDS 102 may consult a database table to determine if the data object has already been placed in an object store, such as object store 104. If the data object already exists, there is no need to write it to the object store a second time. MDS 102 may perform this check by comparing the provided object identifier to all of the object identifiers in the table. If there is a match, the data object exists. If there is not a match, the data object does not exist.

If the data object already exists in object store 104, client 100 may not need to transmit the data object to the store a second time. Instead, MDS 102 may create a new entry in the table comprising the object identifier and the location client 100 wishes to write the data. MDS 102 may then transmit a write complete notification to client 100, and the write process may terminate. Should client 100 issue a subsequent read for the object, MDS 102 may provide a URL to the data object on object 104 as discussed above. This process provides an inherent form of data deduplication by ensuring a data object is not written to the same object store multiple times.

If MDS 102 determines object store 104 does not have a copy of the data object (i.e. the object identifier is not found in the table), it may create a new entry for the object as discussed above. MDS 102 may additionally provide an object location back to client 100, and associate this object location with the new table entry. In some embodiments the object location is a URL constructed in the same manner as the URL generated during the read process.

Once client 100 receives the object location it may write the data object to that location. If the object location is a URL identifying an object store, such as object store 104, client 100 may write the data to that location using an HTTP POST or PUT. The POST/PUT request may include the data object client 100 wishes to store on object store 104. Client 100 may wait for a confirmation from object store 104 before determining the write was successful. Upon determining the write was successful, client 100 may transmit a commit request back to MDS 102. Once MDS 102 receives the commit request, it may update its metadata tables to indicate the location of the data object and that the write is successful.

While the above examples discuss reading and writing data objects as individuals, other configurations may exist. For example, individual data objects may be broken into a set of data chunks or segments. Each of these data chunks may be stored and accessed on the object store in the same manner as the individual data objects discussed above. When a client wishes to read a data object, the client may submit identifiers for all the data object's constituent chunks to the MDS and receive a URL for each. Similarly, for writes the client may submit identifiers for all the data object's constituent chunks to the MDS. In response, the MDS may only provide write URLs for the chunks that do not already exist on the object store. If the chunks already exist the MDS may simply update the metadata table; there is no need to write the chunks a second time.

In certain embodiments, dividing files into chunks, segments, or data objects before a client writes them to the distributed file system may enhance the distributed file system. This could, for example, reduce data redundancy, enhance compression, and/or improve read/write performance. Clients may store these data segments locally in a write-back buffer, which may be periodically flushed. To ensure other clients do not overwrite the file or read incorrect or incomplete data, a MDS may grant a client a write lease. Write leases may prevent any client other than the owner from writing data to a particular file.

Figure 2:
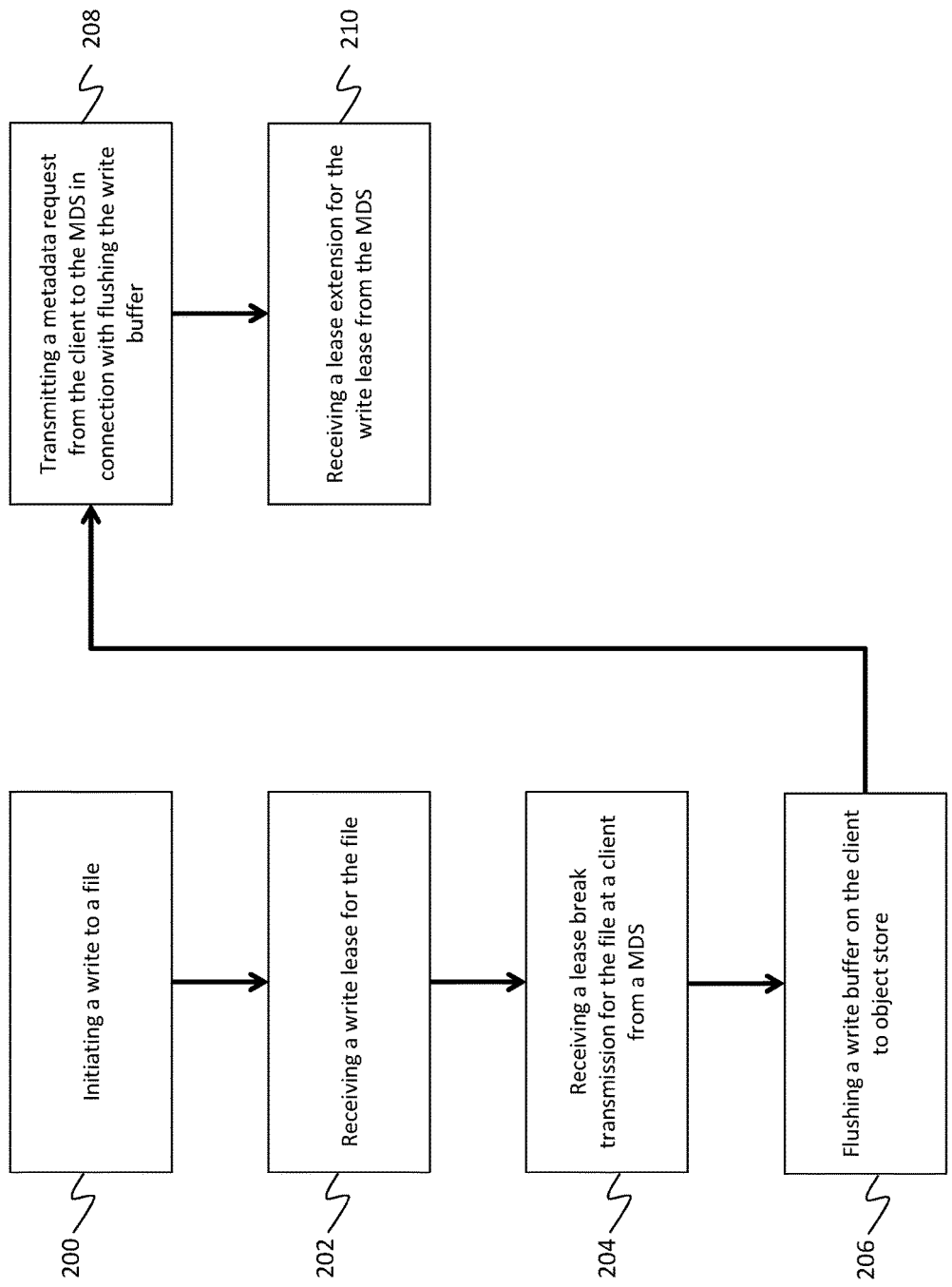
FIG. 2 depicts a process for providing write leases consistent with an embodiment of the present disclosure.

Turning now to FIG. 2, a process for handling write leases and write-back buffers is discussed. In some embodiments, this process may occur on a system substantially similar to FIG. 1.

At block 200, a client may initiate a write to a file on a distributed file system. This initialization could be, for example, an intent transmitted to a MDS to create a new file. Additionally or alternatively, it may be a request to write to an existing file. In some embodiments, the intent may identify the location of the file on the distributed file system, as well as metadata information such as file type, permissions, etc.

In response to the write intent, at block 202 a MDS may grant the client a write lease on the file. In some embodiments, a write lease may be a flag, attribute, or other designator indicating that the file is not available to other clients for reading and/or writing. Granting a write lease to a particular client may ensure other clients do not overwrite data that the client holding the lease is writing. The write lease may further enable clients to read from a file only after changes have been committed, rather than mid way through a write process. In some embodiments, the write lease is not transmitted back to a client. Rather, the write lease is associated with the client and stored on MDS. If a different client attempts to read and/or write to the file, the MDS will note the write lease and either delay and/or reject the other client's request.

Once a client has a write lease for a file, the client may begin to write the data. In some embodiments, the file may be divided into data objects, segments, blocks, or chucks, as discussed above. The MDS may generate URLs for these objects, and they may be used to write to a remote objects store.

In some embodiments, a write-back buffer may be used to write the file to the object store. The write-back buffer may be a data structure that buffers write requests, such as data objects and/or their associated URLs, prior to making them to the object store. This write-back buffer may reside locally on the client, and may facilitate higher data transfer parallelism in the system.

Maximizing transfer parallelism may enhance the system's performance, and may be calculated as a bandwidth delay product ("BDP"). BDP may be defined as the amount of data in transit over a network to maximize bandwidth utilization. In a system with one connection that supports pipelining between a client and an object store, BDP may be calculated as the total available bandwidth multiplied by the round trip time. In a system that does not support pipelining or with multiple connections, a multiple of the calculated BDP may be necessary.

In some embodiments, the BDP may be associated with the write back buffer size. For example, the calculated BDP may be the theoretical minimum size for the write-back buffer. If the system does not support pipelining or utilizes multiple connections between the client and the object store, the write-back buffer size may be a multiple of the calculated BDP.

At block 204, the client may receive a lease break transmission from the MDS. This could occur, for example, while the client has data in the write-back buffer or is transmitting data to the object store. In some embodiments, a lease break transmission indicates that a client should commit all of the writes made to a file. For example, the lease break may indicate that the client should flush a write-back buffer containing data segments for a particular file to an object store for persistent storage. The lease break transmission may be sent from the MDS to the client when a different client attempts to read and/or write to the file, or after a designated time-to-live expires.

At 206, the client may initiate a flush to the object store. For example, the client may flush all of the data in the write-back buffer to the object store. Flushing the data may ensure that it is persistently stored before another client accesses it. Flushing the write-back buffer may, however, take a period of time. If the MDS issues a lease break and immediately enables another client to read the file using data in the object store, the data may be out of date or corrupt since the first client has not finished flushing the buffer. The present disclosure addresses this challenge.

At block 208, a metadata request may be transmitted from the client to the MDS in connection with flushing the write back buffer. For example, if the buffer is filled with data objects and/or segments, the client may request write URLs for each object from the MDS. This request, or write intent (as discussed above) may constitute a metadata request to the MDS. Similarly, once a data object has been written the client may transmit a commit request to the MDS. This commit may also be a metadata request associated with the flush.

In some embodiments, anytime or some of the time the MDS receives a metadata request from a client a count associated with the write lease may be incremented. This count may be a lease extension count, and may monitor the number of lease extensions a client may receive. Lease extensions may be extend a client's write lease, even after lease expires and/or a lease break has been transmitted to the client. For example, the MDS may receive a request from a different client while a client is flushing a write-back buffer to an object store. The MDS may then determine whether a client has any lease extensions available (i.e. the lease extension count is above 0). If it does, the count may be decremented and the lease may be extended for a period of time. Once the time expires, a lease break may be transmitted to the client. In some embodiments, the lease extension counter may be capped, such as at 1 extension. Once the counter reaches 0, no additional leases may be granted. Additionally or alternatively, the lease extension counter may not be incremented during a flush process.

At block 210, a lease extension for the client may be received. For example, an extension notification may be transmitted to the client. Additionally or alternatively, a lease break may be retained at the MDS and not transmitted to the client until the extension expires.

Figure 3:
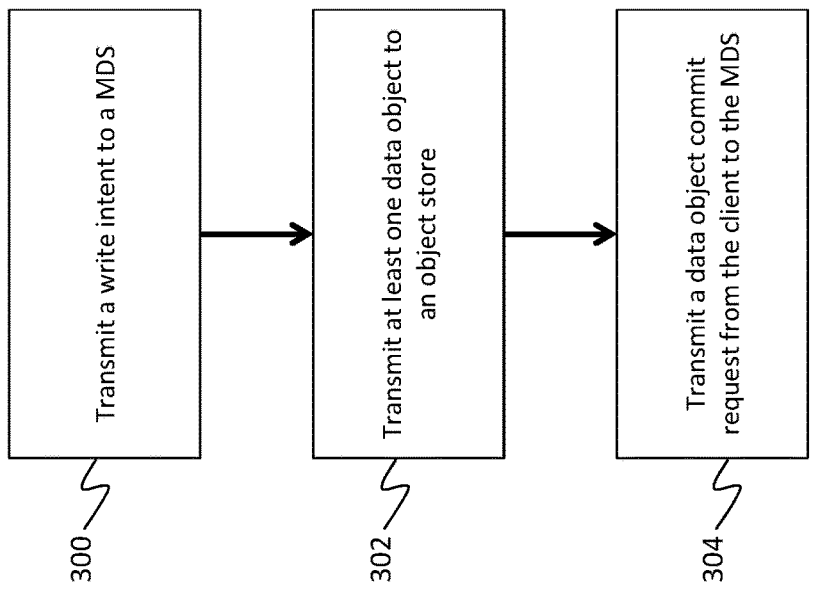
FIG. 3 depicts a process flushing a write buffer consistent with an embodiment of the present disclosure.

Turning now to FIG. 3, a process for flushing a write-back buffer is discussed. At block 300, a write intention may be transmitted to a MDS. In an embodiment, the write intent may be transmitted for every data object in the write-back buffer. In response, the MDS may provide write URLs for one or more data objects in the write back buffer.

Once the client receives a URL, it may write at least one of the data objects to an object store at block 302. This may be substantially similar to the write process discussed above.

Finally, once the write is successful, the client may transmit a data object commit request back to the MDS. This commit request may enable the MDS to update the metadata associated with the data object to indicate that the write was successful.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for providing write leases in a distributed file system ("DFS"), the distributed file system including a metadata server ("MDS") and an object store that is separate from the MDS, wherein metadata stored at the MDS includes location data for all data objects stored in the distributed file system and wherein the metadata includes a mapping of each data object to one or more object store locations and wherein data objects identified by the metadata are stored only at the object store, wherein communications between a client and the MDS are separate from communications between the client and the object store, the method comprising:

initiating a write to a file, by the client, by transmitting a write intent to the MDS, wherein the MDS grants a write lease for the file to the client, wherein the write lease is stored only at the MDS and prevents other clients from writing to the file stored at the object store;

receiving a lease break for the file at the client from the MDS, wherein the lease break indicates to the client to commit all writes made to the file to the object store;

flushing a write buffer on the client to the object store by the client by writing data objects associated with the file and stored in the write buffer to the object store, wherein communications between the client and the object store are separate from communications between the client and the MDS;

in connection with flushing the write buffer, transmitting a metadata request from the client to the MDS in connection with flushing the write buffer to the object store to obtain write URLs from the MDS for data objects associated with the file;

decrementing a lease extension count, by the MDS, in response to the metadata request and providing a lease extension for the write lease, wherein the lease extension is denied when the lease extension count is zero, wherein the lease extension count is not incremented while flushing the write buffer;

receiving the lease extension for the write lease from the MDS for the file in response to the metadata request, wherein the lease extension is maintained by the MDS and prevents other clients from overwriting the file subject to the lease extension;

writing, by the client, the data objects associated with the file to the object store based on the write URLs received from the MDS;

transmitting, by the client, a data object commit request back to the MDS such that the MDS can update metadata associated with all the data objects associated with the file flushed from the write buffer to indicate that the data objects associated with the file were successfully written to the object store.

2. The method of claim 1, wherein flushing the write buffer comprises transmitting at least one of the data objects associated with the file to the object store.

3. A computer program product for providing write leases in a distributed file system ("DFS"), the distributed file system including a metadata server ("MDS") and an object store that is separate from the MDS, wherein metadata stored at the MDS includes location data for all data objects stored in the distributed file system and wherein the metadata includes a mapping of each data object to one or more object store locations and wherein data objects identified by the metadata are stored only at the object store, wherein communications between a client and the MDS are separate from communications between the client and the object store, the computer program product comprising a non-transitory computer readable medium encoded with computer executable program, the code enabling:

initiating a write to a file, by the client, by transmitting a write intent to the MDS, wherein the MDS grants a write lease for the file to the client, wherein the write lease is stored only at the MDS and prevents other clients from writing to the file stored at the object store;

receiving a lease break for the file at the client from the MDS, wherein the lease break indicates to the client to commit all writes made to the file to the object store;

flushing a write buffer on the client to the object store by the client by writing data objects associated with the file and stored in the write buffer to the object store, wherein communications between the client and the object store are separate from communications between the client and the MDS;

in connection with flushing the write buffer, transmitting a metadata request from the client to the MDS in connection with flushing the write buffer to the object store to obtain write URLs from the MDS for data objects associated with the file;

decrementing a lease extension count, by the MDS, in response to the metadata request and providing a lease extension for the write lease, wherein the lease extension is denied when the lease extension count is zero, wherein the lease extension count is not incremented while flushing the write buffer;

receiving the lease extension for the write lease from the MDS for the file in response to the metadata request, wherein the lease extension is maintained by the MDS and prevents other clients from overwriting the file subject to the lease extension;

writing, by the client, the data objects associated with the file to the object store based on the write URLs received from the MDS;

transmitting, by the client, a data object commit request back to the MDS such that the MDS can update metadata associated with all the data objects associated with the file flushed from the write buffer to indicate that the data objects associated with the file were successfully written to the object store.

4. The computer program product of claim 3, wherein flushing the write buffer comprises
transmitting at least one of the data objects associated with the file to the object store.

5. A system for providing write leases in a distributed file system ("DFS"), the distributed file system including a metadata server ("MDS") and an object store that is separate from the MDS, wherein metadata stored at the MDS includes location data for all data objects stored in the distributed file system and wherein the metadata includes a mapping of each data object to one or more object store locations and wherein data objects identified by the metadata are stored only at the object store, wherein communications between a client and the MDS are separate from communications between the client and the object store, the system comprising a computer processor configured to execute instructions comprising:

initiating a write to a file, by the client, by transmitting a write intent to the MDS, wherein the MDS grants a write lease for the file to the client, wherein the write lease is stored only at the MDS and prevents other clients from writing to the file stored at the object store;

receiving a lease break for the file at the client from the MDS, wherein the lease break indicates to the client to commit all writes made to the file to the object store;

flushing a write buffer on the client to the object store by the client by writing data objects associated with the file and stored in the write buffer to the object store, wherein communications between the client and the object store are separate from communications between the client and the MDS;

in connection with flushing the write buffer, transmitting a metadata request from the client to the MDS in connection with flushing the write buffer to the object store to obtain write URLs from the MDS for data objects associated with the file;

decrementing a lease extension count, by the MDS, in response to the metadata request and providing a lease extension for the write lease, wherein the lease extension is denied when the lease extension count is zero, wherein the lease extension count is not incremented while flushing the write buffer;

receiving the lease extension for the write lease from the MDS for the file in response to the metadata request, wherein the lease extension is maintained by the MDS and prevents other clients from overwriting the file subject to the lease extension;

writing, by the client, the data objects associated with the file to the object store based on the write URLs received from the MDS;

transmitting, by the client, a data object commit request back to the MDS such that the MDS can update metadata associated with all the data objects associated with the file flushed from the write buffer to indicate that the data objects associated with the file were successfully written to the object store.

6. The system of claim 5, wherein flushing the write buffer comprises
transmitting at least one of the data objects associated with the file to the object store.

* * * * *